(12) United States Patent
Chandramohan

(10) Patent No.: US 6,285,544 B1
(45) Date of Patent: Sep. 4, 2001

(54) COMPUTER SUPPORTED STORAGE BASKET FOR COMPUTER-RELATED SUNDRIES

(76) Inventor: Kunjuraman Chandramohan, 182 Jerusalem Ave., Levittown, NY (US) 11756

( * ) Notice: Subject to any disclaimer, the term of this patent is extended or adjusted under 35 U.S.C. 154(b) by 0 days.

(21) Appl. No.: 09/450,052

(22) Filed: Nov. 29, 1999

(51) Int. Cl.$^7$ .................................................. G06F 1/16
(52) U.S. Cl. ..................... 361/680; 361/683; 248/918; 248/205.3; 248/311.2; 206/305; 211/126.9; 211/71.01; 312/223.3
(58) Field of Search .................... 361/679–683; D3/201, 304; 211/71.01, 126.9; 312/223.1, 223.2, 223.3; 248/205.3, 683, 918, 672, 220.22, 153, 311.2, 318; 220/485; 206/305

(56) References Cited

U.S. PATENT DOCUMENTS

| | | | |
|---|---|---|---|
| D. 343,712 | * | 1/1994 | Linder ................................ D3/201 |
| 3,647,077 | * | 3/1972 | Gillespie ......................... 211/71.01 |
| 4,040,522 | * | 8/1977 | Vickery ............................. 248/205.3 |
| 4,100,684 | * | 7/1978 | Berger .............................. 211/71.01 |
| 4,971,277 | * | 11/1990 | Tedham et al. ...................... 248/153 |
| 5,042,761 | * | 8/1991 | McBride et al. .................... 248/918 |
| 5,240,243 | * | 8/1993 | Gompertz et al. ............... 248/205.3 |
| 5,409,107 | * | 4/1995 | Browne ............................. 248/918 |
| 5,443,173 | * | 8/1995 | Emery et al. ........................ 220/6 |
| 5,630,546 | * | 5/1997 | Velch ............................... 248/205.3 |
| 5,931,550 | * | 8/1999 | Chen ................................. 361/683 |
| 6,029,580 | * | 2/2000 | Alfonso et al. ..................... 248/918 |
| 6,097,591 | * | 8/2000 | Ircha ................................ 361/683 |

* cited by examiner

*Primary Examiner*—Leo P. Picard
*Assistant Examiner*—Lea Edmonds
(74) *Attorney, Agent, or Firm*—Myron Amer P.C.

(57) ABSTRACT

For an active computer work station at which discs are used to operate the computer and documentation produced as the work product thereof, the use of a storage basket of wire construction material permanently attached to a maintenance access opening closure of the computer housing so that disposal of the basket/closure assembly, if need be, is without significant financial consequence and, prior to disposal, the stored discs, documentation and other such sundries are within the convenient reach of a user of the computer.

2 Claims, 2 Drawing Sheets

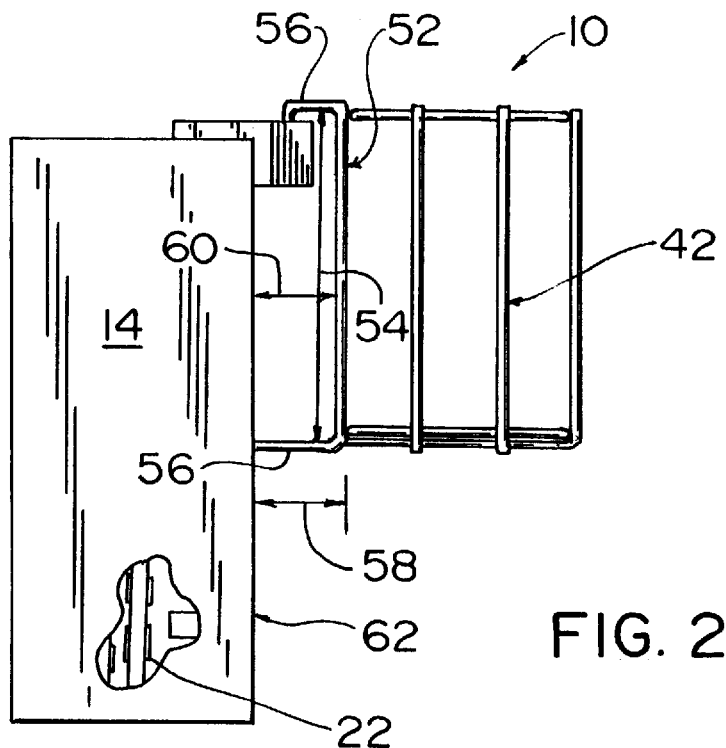
FIG. 2
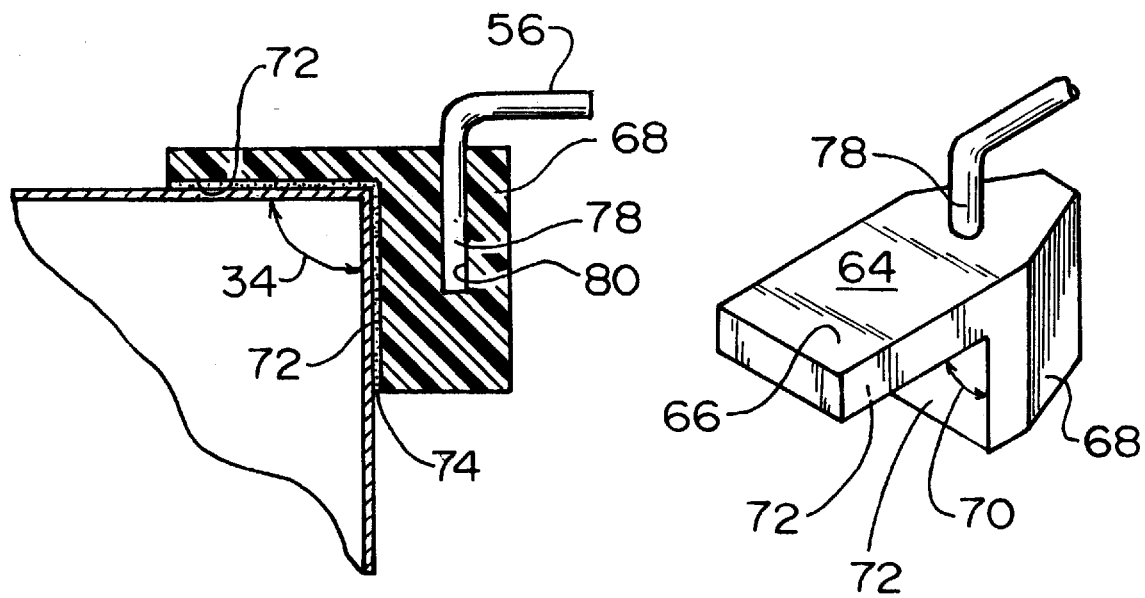
FIG. 3
FIG. 4

COMPUTER SUPPORTED STORAGE BASKET FOR COMPUTER-RELATED SUNDRIES

The present invention relates generally to improvements in the use of a wire basket of the type used for storage or the transporting of sundries in which, more particularly, the noted storage utility is significantly enhanced by the positioning of the wire basket within the convenient reach of the user.

EXAMPLES OF THE PRIOR ART

It is known by common experience that baskets favored for popular use are those of wire construction material because in this construction material there is adequate strength for their intended end purpose, and manufacturing expense is typically nominal and achieved using well known wire-bending and like manufacturing apparatus. Patents exemplifying the popularity of wire baskets are U.S. Pat. No. 3,489,385 for "General Utility Basket" issued to E. F. Dill, Jr. on Jan. 13, 1970, U.S. Pat. No. 3,532,246 for "Locker Basket" issued to P. J. Wenta on Oct. 6, 1970, and U.S. Pat. No. 4,422,556 for "Receptacles For Overhead Storage Systems" to Moore on Dec. 27, 1983, to mention but a few. As popular as is the prior art use of wire baskets, they should be more popular and used in circumstances not now contemplated in order to take greater advantage of their construction material and ease of economical manufacture.

Broadly, it is an object of the present invention to provide a wire basket usage overcoming the foregoing and other shortcomings of the prior art.

More particularly, it is an object of the present invention to locate the wire basket within the reach, and thus in the proximity, of the prospective user thereof, to thereby facilitate the handling management of the contents of the basket.

The wire basket more particularly is provided as an accessory to a computer, and underlying the present invention is the recognition that the attachment of the wire basket to the closure of the computer places it within convenient reach of the user of the computer. The attachment of the wire basket to the closure does not inhibit removal of the closure preparatory to servicing the operating components within the housing. Also, the attachment of the wire basket to the closure can be made permanent so that it can adequately withstand the abuse of wear and yet, due to the permanent attachment, if either the wire basket or the closure have to be replaced, this does not impose any financial burden since each is of a nominal cost.

The description of the invention which follows, together with the accompanying drawings should not be construed as limiting the invention to the example shown and described, because those skilled in the art to which this invention appertains will be able to devise other forms thereof within the ambit of the appended claims.

FIG. 2 is a side elevational view, in a reduced scale, illustrating further structural details;

FIG. 3 is a partial side elevational view illustrating the support provided by the computer to the storage basked; and FIG. 4 is an isolated partial perspective view of a computer and basket interconnecting member.

Figure 1:
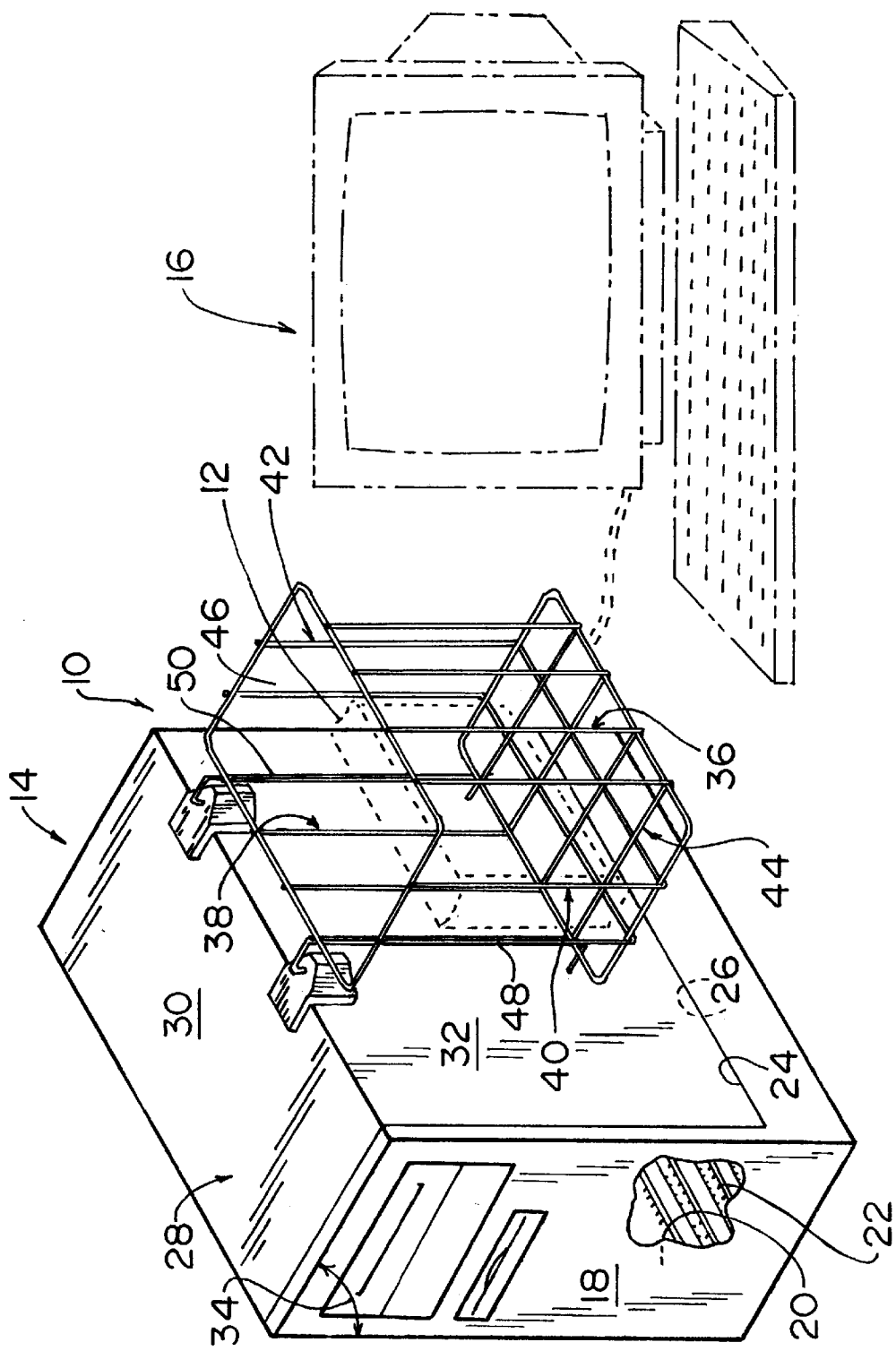
FIG. 1 is a perspective view for a computer supported storage basked in accordance with the present invention.

As a convenience article of manufacture in the specific embodiment of a wire basked 10, for the storage of sundries, such as computer discs downloaded documentation, collectively designated 12 and illustrated in phantom perspective, the proximity of the computer housing 14 to the computer display module 16, also illustrated in phantom perspective, is used to advantage in that a computer user is seated at the module 16 and within reach of the basket 10.

The computer housing 14 has walls, individually and collectively designated 18, bounding a compartment 20 adapted for the housing therein of computer-operating means 22. Edges 24 on the walls 18 bound an access opening 26 into the compartment 20 for maintenance of the computer operating means 22. An inexpensive, replaceable cover or closure 28 is seated in the access opening 26 and has a top wall 30 and a front wall 32 subtending a 90 degree angle therebetween thus matching the 90 degree angle 34 of the computer housing 14.

Adapted to be supported on the computer access opening closure 28 is the noted wire basket, generally designated 10, having a front wall 36, a rear wall 38, opposite side walls 40 and 42, and a bottom wall 44, all interconnected, in a well known manner, into a rectangular configuration bounding a compartment 46 for the storage of the sundries 12. For the end purposes intended, rear wall 38 is comprised of a spaced apart array of vertically oriented plural struts, preferably four in number, of which the opposite end-positioned struts are designated 48 and 50. Welded or otherwise attached to a cooperating end strut 48, 50 is a first connector 52 each of a height 54 corresponding to the height of the struts 48, 50.

On each first connector 52 there is at the top and bottom laterally extending legs 56 of a specified length 58 adapted to hold the basket 10 in a clearance position 60 from the computer housing rear wall 62 which, in practice, has been found to dissipate heat occasioned by the operation of the computer parts 22 which might damage the sundries 12.

Contemplated for use in the attachment of the closure 28 to the basket 10 are second connectors 64, each of plastic construction material and each having an integral horizontally oriented body 66 and a vertically oriented body 68, wherein said bodies 66, 68 subtend a 90 degree angle 70 therebetween. The surfaces, individually and collectively designated 72, of the bodies 66, 68 serve as third connectors, in that an adhesive 74 of a permanent nature is applied to these surfaces 72 and underlying areas of the top wall 76 of the closure 28 to securely hold the basket 10 in its supported position on the computer housing 14. If the closure 28 or basket 10 are inadvertently damaged, the assembly thereof is removed and replaced without significant consequence because each component is readily commercially available and nominal in price.

Completing the attachment of the closure 28 to the basket 10 is the use of a downturned leg 78 which is projected in a force fit into a blind drilled opening 80 in a cooperating body portion.

While the apparatus herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

What is claimed is:

1. In combination:

(1) A computer having walls bounding a compartment disposing therein of computer-operating means, edges on said walls bounding an access opening into said compartment for maintenance of said computer-operating means, a closure for said opening having an edge in a plane of a said compartment wall subtending a 90 degree angle in cross section; and (2) supported on said computer access opening closure a storage basket comprising front, rear, opposite sides and bottom wire-constructed rectangular walls interconnected into a rectangular configuration to bound an objects-storing compartment of said storage basket, said wire-constructed rectangular rear wall comprised of a spaced apart array of vertically oriented plural struts of a selected vertical height, at least two spaced apart first connectors each of a height corresponding to said height of said struts connected to a cooperating strut adjacent to and slightly inwardly of said wire-constructed rear wall and for the entire extents of said heights of said connectors and said struts, on each said connector a top and bottom laterally extending leg of a specified length adapted to hold said wire basket rear wall in a clearance position from a computer wall and in parallel relation thereto, a second pair of connectors each consisting of respectively a vertically and horizontally oriented body presenting third connector surfaces subtending a 90 degree angle therebetween having an operative position connected to a cooperating top leg of a said strut, and permanent-attaching adhesive applied at the interface of said third connector surfaces and said 90 degree angle configurated edge of said closure, whereby said wire basket has proximity for convenient use on said computer.

2. For the convenience of a user at a work station equipped with a keyboard display module operated by a computer during which sundries are used for and generated by said computer, the improvement consisting of a method to facilitate the handling of said sundries comprising the steps of:

(a) using a computer with operating means in a housing having a removable cover to provide maintenance access to said operating means;

(b) using a keyboard display module;

(c) operatively interconnecting said computer and keyboard display module;

(d) establishing a work station for said operatively interconnected computer and keyboard display module;

(e) attaching with a permanent adhesive a wire basket to said computer removable cover; whereby for a computer operator at said work station any sundries for operating and generated by said computer stored in said wire basket are within convenient reach.

* * * * *